Figure 1A:
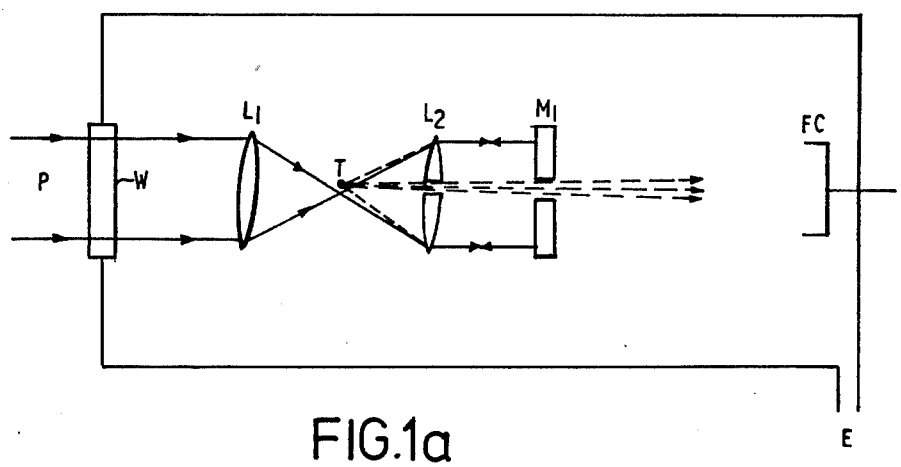

United States Patent [19]

Hora et al.

[11] 4,199,685

[45] Apr. 22, 1980

[54] LASER BEAM ACTIVATED ION SOURCE

[76] Inventors: Heinrich Hora; John L. Hughes; John C. Kelly; Barry Luther-Davies, all of Box 1 Post Office, Kensington, N.S.W. 2033, Australia

[21] Appl. No.: 787,421

[22] Filed: Apr. 14, 1977

[30] Foreign Application Priority Data

Apr. 15, 1976 [AU] Australia ............... PC5614

[51] Int. Cl.$^2$ ............................................. H01J 27/00
[52] U.S. Cl. ........................... 250/423 P; 250/423 R
[58] Field of Search ........... 250/423 R, 423 P, 492 R, 250/281, 282, 298, 299; 55/2; 204/DIG. 11

[56] References Cited

U.S. PATENT DOCUMENTS

| | | | |
|---|---|---|---|
| 3,294,970 | 12/1966 | Jenckel | 250/423 |
| 3,406,349 | 10/1968 | Swain et al. | 250/423 P |
| 3,478,204 | 11/1969 | Brubaker et al. | 250/423 |

*Primary Examiner*—Bruce C. Anderson

[57] ABSTRACT

This invention relates to an apparatus in which laser pulses of up to about one nanosecond duration ($\sim 10^{-9}$ secs) and high intensity, more than $10^{11}$ watts cm$^{-2}$, generate energetic ($>>10$ keV) ions, which can have very high charge states of more than twenty times the charge state of a single electron, from solid or liquid targets using non-liner, electrodynamic forces operating within the target material. In the present invention the energetic, highly charged ions are produced in such a manner that isotopes of a particular element forming the target can be separated into their respective groups travelling at particular velocities and directions, at distances of more than one meter from the irradiated target. In the present invention, the energetic, highly charged ions are generated and accelerated with high efficiency ($>25\%$) within a relatively cold plasma ($<1000$ eV) generated from the target material. The energetic, highly charged ions are ejected from the plasma with velocities of more than $10^7$ cms sec$^{-1}$ thus allowing the separation of mixed isotopes by electric and magnetic fields using techniques well known in the art.

11 Claims, 7 Drawing Figures

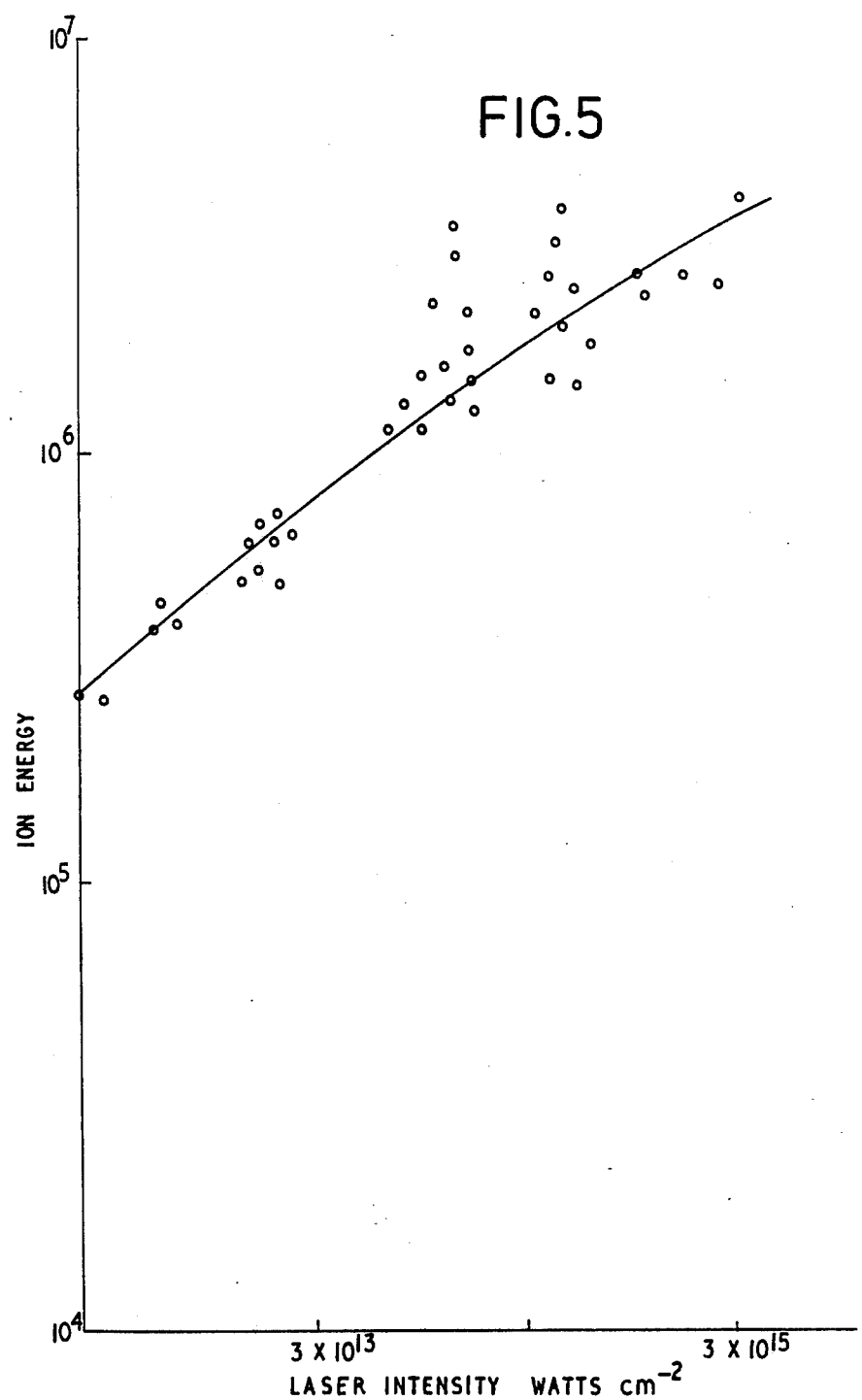

LASER BEAM ACTIVATED ION SOURCE

This invention relates to an apparatus in which laser pulses of up to about one nanosecond duration ($\sim 10^{-9}$ secs) and high intensity, more than $10^{11}$ watts cm$^{-2}$, generate energetic ($>>10$ keV) ions, which can have very high charge states of more than twenty times the charge state of a single electron, from solid or liquid targets using non-linear, electrodynamic forces operating within the target material. In the present invention the energetic, highly charged ions are produced in such a manner that isotopes of a particular element forming the target can be separated into their respective groups travelling at particular velocities and directions, at distances of more than one meter from the irradiated target. In the present invention, the energetic, highly charged ions are generated and accelerated with high efficiency ($>25\%$) within a relatively cold plasma ($<1000$ eV) generated from the target material. The energetic, highly charged ions are ejected from the plasma with velocities of more than $10^7$ cms sec$^{-1}$ thus allowing the separation of mixed isotopes by electric and magnetic fields using techniques well known in the art. It may be of advantage to increase the velocity of the emitted, highly charged ions of a given energy via passage through an electrostatic or similar particle accelerator so that their energy is increased by a factor ZeV where Ze is the charge state of the ion, Z the ionization state of the ion, e the electronic charge and V the total potential drop across the accelerator. For example, 20e charged ion passed through a 1 million volt accelerator would emerge with an energy of 20 million electron volts. Similarly an ion with a charge state of 50e would emerge from a thousand million volt accelerator with an energy of 50 thousand million electron volts (50 GeV).

Obviously in any isotope separation system where the aim is to separate isotopes for power generation in fission reactors it is essential that the total energy used in separating the isotopes be much less than the energy released by the resulting isotopes in any fission process. On the other hand, if the aim is to separate a particular isotope for a task which does not involve further economic processes, then the energy utilized in the isotope separation process may not be critical. An example of the former isotope separation process is the enrichment of natural uranium for nuclear power stations while an example of the latter process could be in pure research applications or in military based research and applications.

The conventional separation of isotopes by mass spectroscopy is energetically highly inefficient because of the low crosssections for the ionization of most materials and the power required to convert the target material into ions. In addition, the density of the generated beam of ions is very low ($10^{10}$ cm$^{-3}$ or less). However, once the target material has been ionized, mass spectrometers allow almost 100% separation of the ions of different isotopes during a single pass. The established isotope separation methods of gas diffusion and gas centrifuge, have the advantage of working at high densities but have the disadvantage of requiring hundreds of units in cascade, and even then achieving only a partial degree of separation. The waste products associated with both the diffusion and centrifuge isotope separation schemes would amount to between 30 and 40 percent of all the Uranium 235 that can be mined. Therefore, there is an obvious need for much more efficient isotope separation techniques such as those represented by the present invention.

The present invention provides a means for combining the virtual 100% separation efficiency of mass-spectroscopic separation with the high density operation of conventional methods.

Prior art systems utilize hot, thermalised plasmas (temperatures up to 10,000 eV) as the source of ions which are then electrostatically extracted from the plasma and passed through electrostatic accelerators. That is to say, the laser generated ion source of prior art systems is used merely as a thermal ion source for particle accelerators.

The present invention differs from prior art systems in that the ions are generated within a cold, unthermalised plasma, rather than a hot thermalised plasma so that we are dealing with plasma temperatures of $<1,000$ eV rather than temperatures up to 10,000 eV as in prior art systems. Furthermore, in the present invention ions may be accelerated to enormous energies ($>1$ MeV) with very high charge states ($>10$e) by non-linear electrodynamic forces acting solely within the cold plasma itself with no external influences being used to extract the ions from the plasma source. Furthermore, the process of ion production in the present invention is an extremely efficient one ($>25\%$), being possibly as high as 90% efficient.

The primary object of this invention is to provide a source of energetic, highly charged ions which emerge from the source in a preferential direction independently of any external influences. Another object of the present invention is to produce groups of particular isotopes of a given element which differ from each other regarding their velocities in such a manner that they can be separated from each other using state of the art electric and magnetic deflection devices. A further object of the present invention is to provide an ion source which is efficient in the conversion of laser to ion energy. A further object of the invention is to provide a cold plasma source where the ions are generated and accelerated by non-linear, electrodynamic forces. A further object of the present invention is to provide an efficient, low temperature source of energetic ions of the isotopes of all elements of the periodic table. A still further object is to provide an efficient source of highly charged ions of all elements of the periodic table for use in particle accelerators, thus extending their energy by a factor equal to the charge state of the ion, e.g. an ion of copper with twenty electrons removed accelerated in a 1 MeV accelerator has a final energy of 20 MeV.

The present invention consists in apparatus for generating energetic ions of a target material from a cold plasma of said material consisting of a means for producing and directing a pulsed laser beam onto said target material to produce said cold plasma, the said beam having an intensity greater than $C\omega^2$ watts cm$^{-2}$ where C is a constant equal to $3 \times 10^{-17}$ watts cm$^{-2}$sec$^{+2}$ and $\omega = 2\pi f$ where f is the frequency of the light of the laser beam, the pulse rate of the laser beam being such that the pulses are short in relation to the collision time in said plasma whereby the threshold of operation of non-linear electrodynamic forces within said plasma is achieved, said forces acting to accelerate and eject ions from said plasma, means defining an evacuated chamber containing said target material, optical means for focussing said laser beam onto said target material.

The present invention further consists in a method of generating energetic ions wherein a pulsed laser beam is focussed on a target material in an evacuated chamber to produce a cold plasma on said target material, the beam having an intensity greater than $C\omega^2$ watts cm$^{-2}$ where C is a constant equal to $3 \times 10^{-17}$ watts cm$^{-2}$sec$^{+2}$ and $\omega = 2\pi f$ where f is the frequency of the light of the laser beam, the pulse rate of the laser beam being such that the pulses are short in relation to the collision time in said plasma whereby the threshold of operation of non-linear electrodynamic forces within said plasma is achieved, said forces acting to accelerate and eject ions from said plasma.

Figure 2:
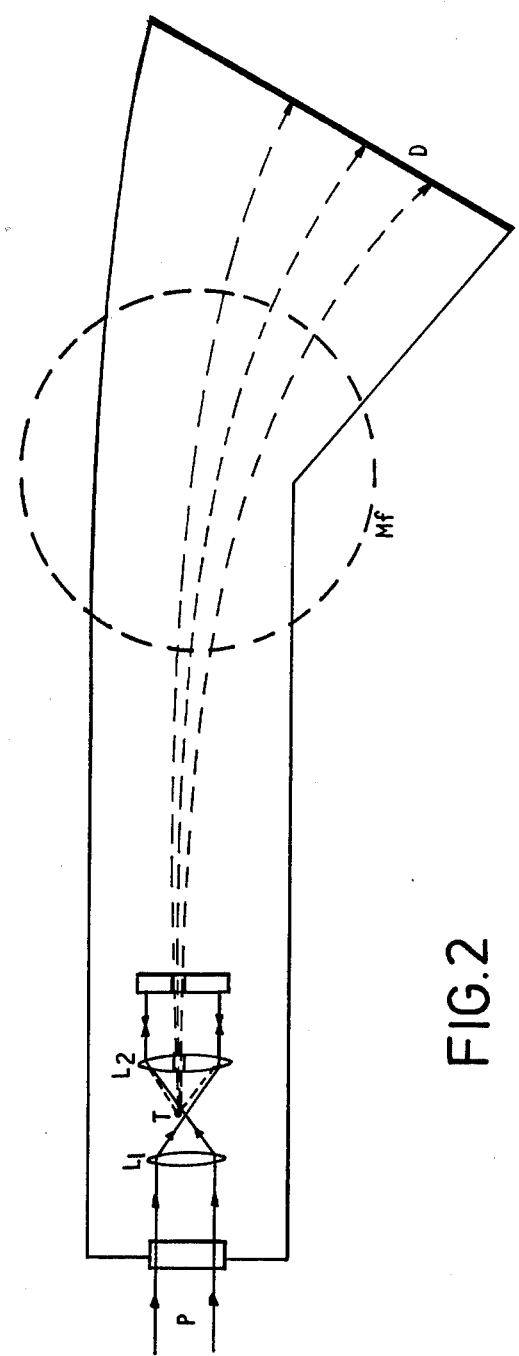
Figure 3:
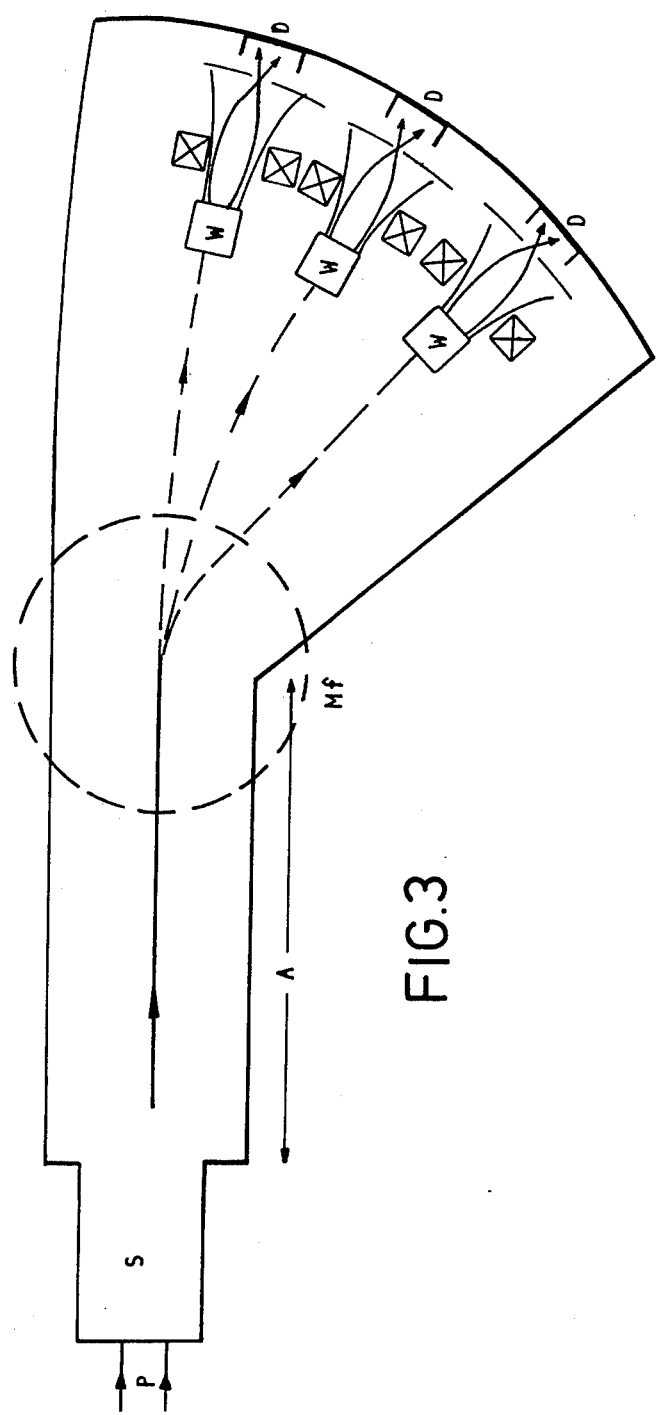
Figure 4:
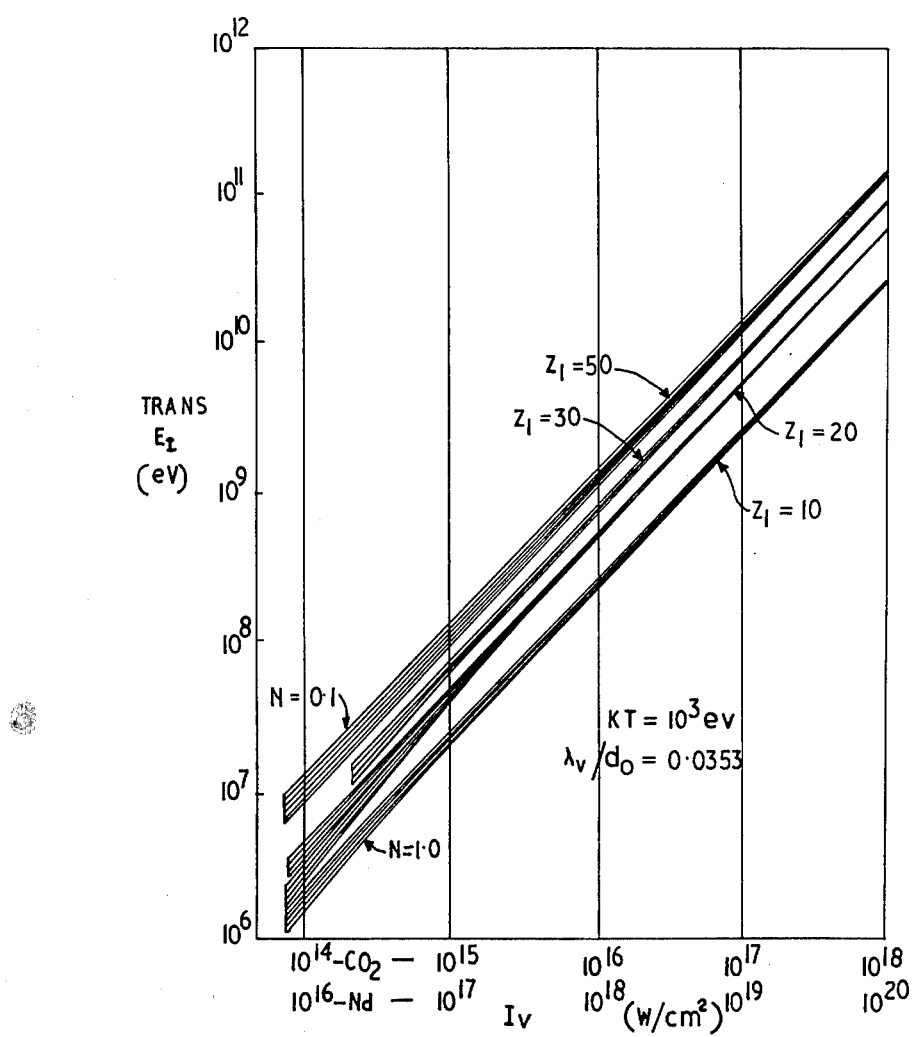

Other objects and characteristics of the present invention will result from further consideration given below in conjunction with the following figures FIGS. 1a, b and c are schematic representations of laser generated ion sources according to the present invention, FIG. 2 shows the layout of the ion source in the form of an isotope separator, FIG. 3 shows the inclusion of a state of the art particle accelerator in the present invention to boost the ion energy, a technique which can reduce the laser beam energy required to activate the ion source, FIG. 4 shows the calculations of the translative ion energy $E_I^{trans}$ of charge $Z_I$ (for examples of 10 to 50) in dependence of the laser Intensity I at the irradiated solid target surface. The Intensities are given for a neodymium glass laser, focussed down to 30μ (half maximum intensity) diameter and for a CO$^2$ laser focussed to 300μ diameter. The splitting of the curves is due to the detailed calculation of the density N (N is given in multiples of the cut-off density $n_{ec}$) in the area of the beam diameter of one wave length (see E. L. Kane and H. Hora, Laser Interaction and Related Plasma Phenomena Plenum, New York, 1977 Vol. 4). The plasma temperature is $10^3$ eV, with a change of the temperature between 1 to $10^5$ eV does not affect the result by more than 5%.

FIG. 5 shows experimental results of the effect of ion energy in electron volts on the laser intensity in Watts/cm$^2$.

In carrying out the present invention in a preferred manner there is provided a means of generating energetic, highly charged ions within a laser activated cold plasma of a given target which may be a solid or a gas or a liquid in suitable containers comprising means of generating intense laser pulses as known in the art and of directing these laser pulses into an evacuated enclosure containing the target material in a rod, disc or block form as indicated in FIG. 1. After entering the target housing via an appropriately polished optical entrance window, the laser pulse is focussed by a lens or mirror so as to pass above or below the target and diverge towards the second lens which collimates the laser beam defined by the laser pulse in such a manner that it is then directed to a 100% reflecting mirror which is tilted in such a manner as to ensure that the laser pulse is focussed onto the rear surface of the target material with respect to its path of incidence into the target chamber. The intense, focussed laser pulse then interacts with the target material converting part or all of it into a cold plasma where, via a non-linear, electrodynamic force interaction, highly charged ions are generated and accelerated to very high energy over relatively short distances of the order of, or much less than 100 microns.

We have considered one possible form of the non-linear electrodynamic forces that could be operating within the laser activated cold plasma. This particular form of a non-linear electrodynamic force will be utilized to indicate the effectiveness of such forces in accelerating highly charged ions to very high energy, it being stressed that this example is not intended to restrict the scope or nature of the non-linear, electrodynamic forces that could be operative within the cold plasma, ion source constituting the present invention.

The action of the non-linear force can be seen in a highly simplified way from the force density $f_{NL}$ to electrons resulting in a net plasma force density of $$f_{NL} = -\frac{1}{8\pi} \frac{\partial}{\partial x}(E^2 + H^2)$$

where E and H are the electric and magnetic field strengths of the laser field in the plasma. If—as e.g. in the WBK case - the amplitudes are given by their value in vacuum $E_v$ and the complex refractive index $\tilde{n}$ ($E = E_v/|\tilde{n}|$; $H = E_v|\tilde{n}|$), then the non-linear force is $$f_{NL} = \frac{E_v^2}{16\pi} \frac{n_e}{n_{ec}} \frac{d}{dx} \frac{1}{|\tilde{n}|}$$

($n_e$ = electrons density, $n_{ec}$ = cut-off density). The energy of Z times charged ions is given by $$E_i = Z \frac{e^2}{4mw^2} [E^2_{max} - E_v^2]$$

(e = charge and m = mass of electrons, w = laser frequency). The $E_v$ value is valid for acceleration along the laser beam axis for lateral acceleration, $E_v$ is zero. $E_{max}$ is determined by dielectric swelling due to the refractive index and by the relativistic self-focussing of the beam diameter down to one wave length (H. Hora and E. Kane, "Super-High Intensities of Lasers by Short-Range Relativistic Self-Focusing of the Beams in Plasma and Dielectric Swelling", Applied Physics, volume 13, pages 165 to 170, March 1977, published by Springer-Verlag).

The non-linear, electrodynamic force accounting for the interaction between laser radiation and ions in the cold plasma in the above unrestrictive example leads to the predictions shown in FIG. 4. Using a Neodymium laser beam (of 30 wave length diameter) focussed to a flux density in the range $10^{16}$ to $10^{20}$ watts cm$^2$ (or equivalently a carbon dioxide laser beam focussed to attain the flux density range $10^{14}$ to $10^{18}$ watts cm$^{-2}$) there can be expected for a Z=10 ion, that is an ion with ten charges, a kinetic energy ranging from $10^6$ eV(1 MeV) to $3 \times 10^{10}$ eV or 30 GeV. With $Z_I = 50$, the ion energy would be expected to range from $10^7$ eV or 10 MeV to over $10^{11}$ eV or 100 GeV. Therefore the predicted performance of the present invention far exceeds any prior art devices capable of only tens of KeVs ion energies, the difference being many orders of magnitude. Furthermore, the ions of the present invention are emitted independently of any external influences.

In experiments to date, there has been observed highly charged (>25e) ions of up to 5.6 MeV as shown in FIG. 5. It is not known if higher energy ions were produced in these experiments due to a lack of appropriate diagnostics and restricted laser pulse intensity. However, a remarkable agreement with the lowest energy predictions of FIG. 4 has been observed and the uniqueness of the present invention has already been confirmed experimentally. As higher laser pulse intensities become available there is no reason known at present for us to doubt the accuracies of the predictions shown in FIG. 4.

Figure 1B:
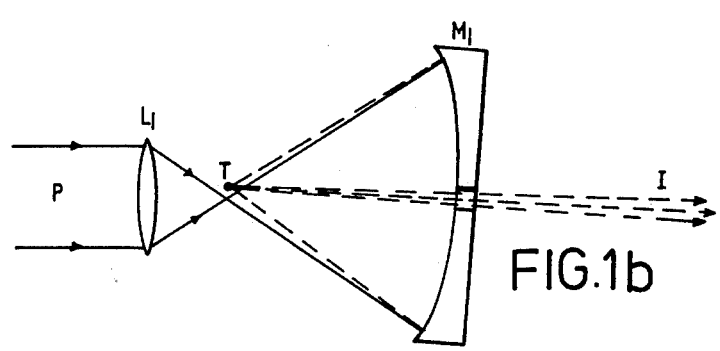
Figure 1C:
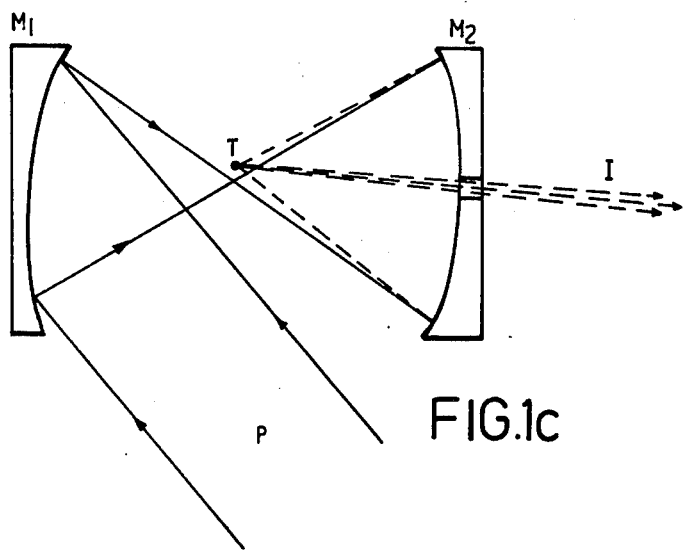

For a more detailed consideration of the invention, reference is made to FIG. 1a and the alternative focussing devices illustrated in FIGS. 1b and 1c. A laser pulse P which, in the case of a neodymium laser should exceed a peak power of $10^9$ watts, enters the evacuated chamber ($<10^{-5}$ torr) E of the present invention through the optically polished entrance window W. The laser pulse P is then focussed by the lens L, so as to pass near the target T constituting the material from which the ions will be created. After passing near the target T, the laser pulse P then expands onto the lens $L_2$ which collimates it into a near parallel beam which is reflected by mirror M back through $L_2$ in such a manner that the pulse P is focussed onto the rear of target T. The cold plasma thus formed from the material of target T is predominantly in the form of fast ions and their associated electrons. The fast ions are emitted predominantly along the axis of the incident laser beam so that they shoot out of the cold plasma, through the hole in the lens $L_2$ and mirror M and onto the Faraday Cup detector F.C. which can be several meters away from T. In experiments the ion flight path was up to 1.8 meters and the maximum recorded ion velocity was over $2 \times 10^8$ cms sec$^{-1}$ when the target T was a gold wire about 200 microns in diameter. In order to avoid unnecessary collisions between the emitted ions and residual air molecules, the chamber E of the present invention should be evacuated to as low a pressure as possible. During the course of experiments a pressure of about $10^{-6}$ torr was achieved with relative ease, using an oil diffusion pump. The lens-flat mirror ($L_2$-m) combination of FIG. 1a can be replaced with the single curved mirror $M_2$ shown in FIG. 1b. Furthermore, the double curved mirror optical focussing system shown in FIG. 1c will also be used. It should be noted that the cross-section of both laser beam P and optical elements $L_1$, $L_2$, M and $M_2$ shown in FIG. 1 may be circular, elliptical, or rectangular or of an elongated rectangular configuration. Furthermore, the laser focus area on the rear of target T may be of circular or line configuration.

FIG. 2 shows the layout of an embodiment of the present invention in the manner required for isotope separation. The energetic, highly charged ions I are emitted from the laser activated source S, pass through the magnetic field MF or combined electric and magnetic field and are separated into groups on the depositor D. The degree of isotope separation will depend on the energy and charge state of the ions, the strength of the magnetic or electric field and the ion flight path. However, in specific instances, for example in the case of separating Uranium 235 from Uranium 238 for nuclear fission power reactors, the more sophisticated isotope separation apparatus shown in FIG. 3 can be used. Here the energetic multicharged ions are emitted by the laser activated source S at, for example, about 1 MeV and passed through an electrostatic accelerator with potential drop V. If the Uranium ions have charge +92e, then they will emerge with an energy of 92 MeV. They can then be isotope separated at this, or indeed a much lower energy, the individual isotopes being collected at the separated regions D after, if necessary further focussing by the ion optics shown at W.

The apparatus of the present invention can be described in its principal functions by the following example which must be taken in conjunction with the above figures. A laser beam is generated from a single-mode quality and a Gaussian density profile of one pulse of preferably 1 to 50 picoseconds ($10^{-12}$ to $5 \times 10^{11}$ seconds) but possibly 100 picosecond duration and of $10^{-4}$ to 100 Joule energy of wavelength between 300$\mu$ and 0.01$\mu$ where $\mu = 10^{-6}$ meters. A sequence of such pulses with a frequency of $10^6$ per second or more should be provided. Each pulse produces energetic multi-charged ions as discussed above. If the target T is a high Z material, the generated plasma will be split into several groups of ions with constant Z and very low temperature (less than 1000 eV). If the emitted ions are further accelerated by a suitable linear accelerator by a voltage V, followed by focussing and bending as discussed above with reference to FIG. 3, one practical example is to use a $CO_2$ or iodine laser with a pulse of 0.1 Joules and a frequency of $10^6$ H$_z$. The target T, or the laser beam, has then to be moved axially with a speed v given by the diameter 'a' of the target erosion crater and the laser frequency f by $v = a.f.c^{-1}$ where c is between 0 and $10^3$. The total fast ions generated per second are then more than $10^{22}$. Therefore, more than $7 \times 10^{19}$ atoms per second are separated from a $7 \times 10^{-3}$ part isotope as is the case with Uranium. The separation rate can then be $2.5 \times 10^{23}$ atoms per hour under ideal conditions. Taking into account practical losses, about $10^{23}$ atoms of $U_{235}$ could be gained per separation cycle resulting in about 300 grams per day of $U_{235}$ being separated up to 100%. In practice, an enhancement of only about 2% in the $U_{238}/U_{235}$ ratio is required for commercial power production using Uranium reactors. An even more favourable isotope separation process that can be carried out using the present invention is the production of heavy hydrogen or deuterium. This extremely valuable isotope of hydrogen can be used in both fission power reactors as a moderator and also in fusion power generation as fuel. These examples of the uses of the present invention are outlined to stress the scope of the invention and are not intended to restrict the use of the invention in any way. For example, it may be a very uneconomic process to separate particular isotopes from a commercial viewpoint although very beneficial from a pure research viewpoint. Furthermore, the energetic isotopes that can be produced by the present invention correspond to amounts of up to several GeV per nucleon. For Example, 1 joule of laser pulse energy represents about $10^{19}$ eV so that up to $10^{10}$ ions of 1 GeV energy could be produced per joule by the present invention assuming high efficiency for the conversion of laser light to ion energy. With laser pulse energies of up to $10^4$ joules which we anticipate in the foreseeable future, up to $10^{14}$ ions of 1 GeV or up to $10^{12}$ ions of 100 GeV can be contemplated (FIG. 4).

Many of the most interesting nuclear interactions involving heavy ions require ions with about 10 MeV per nucleon. For example, a $U_{235}$ ion would require a total energy of 2.35 GeV. Furthermore, the intensity of such energetic ions that can be produced with the present invention implies that the period for observing such interactions to secure confirmed results is drastically reduced in comparison with any low intensity apparatus for ion production.

The electrons emitted with the ions from the cold plasma of this invention maintain charge neutrality for the emissions as a whole. However, they can be kept separated from the ions and are not considered in detail.

We claim:

1. Apparatus for generating energetic ions of a target material from a cold plasma of said material comprising means for producing and directing a pulsed laser beam onto said target material to produce said cold plasma, the said beam having an intensity greater than $C\omega^2$ watts cm$^{-2}$ where C is a constant equal to $3\times10^{-17}$ watts cm$^{-2}$sec$^{+2}$ and $\omega=2\pi f$ where f is the frequency of the light of the laser beam, the pulse rate of the laser beam being such that the pulses are short in relation to the collision time in said plasma whereby the threshold of operation of nonlinear electrodynamic forces within said plasma is achieved, said forces acting to accelerate and eject ions from said plasma, means defining an evacuated chamber containing said target material, and optical means for focussing said laser beam onto said target material.

2. Apparatus as claimed in claim 1 including means for separating ions of different isotopes ejected from said plasma by said nonlinear electrodynamic forces.

3. Apparatus as claimed in claim 1 wherein the said optical means comprises two lenses placed in the laser beam, one on each side of the target material, a first lens focussing the said laser beam near the said target material and a second lens, which has a central aperture, collimating the diverging laser beam onto a flat reflector, also with a central aperture, so that the laser beam is reflected back through the second lens, at such an angle to the laser beam incident on its surface as to allow the second lens to focus the returning laser beam through a rear surface of the target material with respect to the first lens, the apertures in both the second lens and the flat reflector being such as to allow the passage of the emitted ions.

4. Apparatus as claimed in claim 1 wherein said optical means comprises two curved mirrors positioned in the laser beam on either side of the target material in such a manner that a first curved mirror focusses the laser beam near the target material in such a manner that the beam then diverges onto the reflecting surface of a second curved mirror which in turn steers the beam in a focussed configuration so as to pass through the rear surface of the target material with respect to the first curved mirror, the second curved mirror having a central aperture to allow the passage of fast ions emitted by the plasma so formed on the target material.

5. Apparatus as claimed in claim 1 wherein said optical means comprises a lens and a curved reflector with a central aperture, placed in the path of the laser beam, the former in front of the target material and the latter behind the said target material and positioned in such a manner that the laser beam focussed by the lens near the target material, diverges onto the curved mirror and is reflected and focussed in such a manner that it enters a rear surface of the target material with respect to the lens thus generating the required cold plasma and allowing the energetic, highly charged ions emitted by such a plasma to pass through its central aperture.

6. Apparatus as claimed in claim 1 incorporating ion accelerating means to boost the kinetic energy of ions generated.

7. Apparatus as claimed in claim 1 where the target element is a solid.

8. Apparatus as claimed in claim 1 wherein the target element is a liquid contained in a suitable container.

9. Apparatus as claimed in claim 1 wherein the target element is gas contained in a suitable container.

10. A method of generating energetic ions comprising: focussing a pulsed laser beam on a target material in an evacuated chamber to produce a cold plasma on said target material, the beam having an intensity greater than $C\omega^2$ watts cm$^{-2}$ where C is a constant equal to $3\times10^{-17}$ watts cm$^{-2}$sec$^{+2}$ and $\omega=2\pi f$ where f is the frequency of the light of the laser beam, the pulse rate of the laser beam being such that the pulses are short in relation to the collision time in said plasma whereby the threshold of operation of non-linear electrodynamic forces within said plasma is achieved, said forces acting to accelerate and eject ions from said plasma.

11. A method as claimed in claim 10 wherein ions of different isotopes are separated.

* * * * *